US006683886B1

(12) United States Patent  (10) Patent No.: US 6,683,886 B1
van der Tuijn et al.  (45) Date of Patent: Jan. 27, 2004

(54) BLUETOOTH COMMUNICATION UNITS, WIRELESS COMMUNICATION SYSTEMS, WIRELESS COMMUNICATION DEVICES, BLUETOOTH COMMUNICATIONS METHODS, AND WIRELESS COMMUNICATION METHODS

(75) Inventors: Roland van der Tuijn, Mougins (FR); Michel Eftimakis, Juan les Pins (FR); Denis Audoly, St. Laurent du Var (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/421,624

(22) Filed: Oct. 19, 1999

(51) Int. Cl.$^7$ .............................................. H04L 12/43
(52) U.S. Cl. ..................................................... 370/458
(58) Field of Search .......................... 370/449, 342–346, 370/329, 310–315, 367, 389–395, 458–466, 354, 493, 229, 412; 375/322, 133, 222, 304; 455/519, 450–454, 62; 343/853, 824, 893; 379/102.03, 102.01, 93.17, 93.01, 93.28; 341/137; 345/89

(56) References Cited

U.S. PATENT DOCUMENTS

| | | |
|---|---|---|
| 5,280,630 A | 1/1994 | Wang |
| 5,471,671 A | 11/1995 | Wang et al. |
| 5,530,912 A | 6/1996 | Agrawal et al. |
| 5,608,727 A | 3/1997 | Perreault et al. |
| 5,694,392 A | 12/1997 | Gaglione et al. |
| 6,097,703 A | 8/2000 | Larsen et al. |
| 6,275,500 B1 * | 8/2001 | Callaway, Jr. et al. ...... 370/449 |
| 6,366,622 B1 * | 4/2002 | Brown et al. ................ 375/322 |
| 6,393,012 B1 * | 5/2002 | Pankaj ........................ 370/342 |
| 6,477,378 B1 * | 11/2002 | Halminen .................... 455/450 |

FOREIGN PATENT DOCUMENTS

| | | |
|---|---|---|
| EP | 0690650 | 1/1996 |
| WO | 9929126 | 1/1994 |
| WO | 9619887 | 6/1996 |
| WO | 9941876 | 8/1999 |

OTHER PUBLICATIONS

Johansson, P.; et al., Communications, Jun. 1999., ICC '99 IEEE International Conference on, vol. 3, pp. 1414–1420.*

* cited by examiner

Primary Examiner—Chi Pham
Assistant Examiner—Prenell Jones
(74) Attorney, Agent, or Firm—Peter Zawilski (57) ABSTRACT

Bluetooth communication units, wireless communication systems, wireless communication devices, Bluetooth communication methods, and wireless communication methods are provided. One aspect of the invention provides a Bluetooth communication unit including communication circuitry configured to communicate wireless signals using a plurality of communication links of a piconet according to a Bluetooth communication protocol; and processing circuitry coupled with the communication circuitry and configured to at least one of provide data into packets to be communicated in slots using the communication links and retrieve data from packets communicated in slots using the communication links, the processing circuitry being further configured to analyze the communication links of the piconet and to prioritize an order of communication of the packets responsive to the analysis.

5 Claims, 8 Drawing Sheets

BLUETOOTH COMMUNICATION UNITS, WIRELESS COMMUNICATION SYSTEMS, WIRELESS COMMUNICATION DEVICES, BLUETOOTH COMMUNICATIONS METHODS, AND WIRELESS COMMUNICATION METHODS

TECHNICAL FIELD

The present invention relates to Bluetooth communication units, wireless communication systems, wireless communication devices, Bluetooth communication methods, and wireless communication methods.

BACKGROUND OF THE INVENTION

Numerous wireless communication protocols have been introduced in recent years to accommodate a number of diverse communication applications. Exemplary conventional communication protocols include Personal Handy-Phone Systems (PHS) and Digital Enhanced Cordless Telecommunications (DECT) and Global Systems for Mobile Communications (GSM). Such communication protocols provide communication channel slots structured in frames individually containing multiple slots. Data packets are allocated to communication slots in such communication systems. The frame structures are repeated in time and each time the appropriate slot number occurs, the data packet associated with the slot is either transmitted or received.

Figure 1:
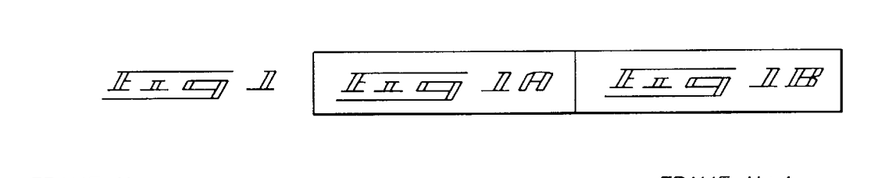
Figure 1A:
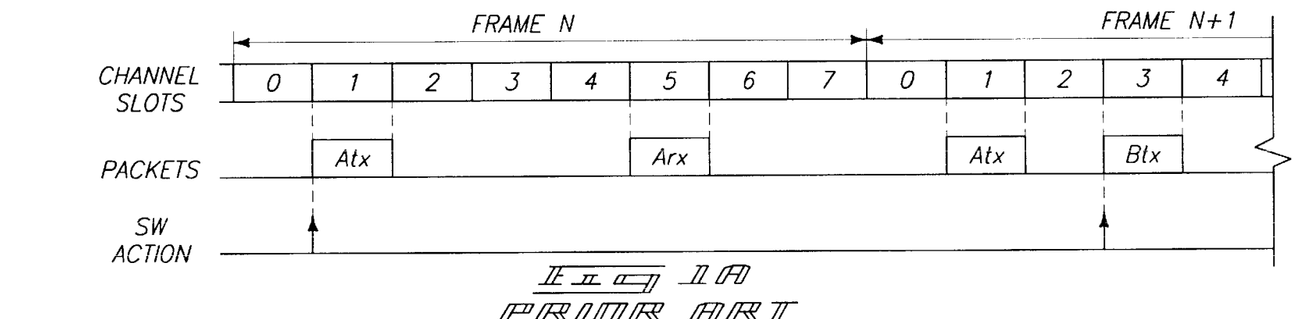
FIG. 1A–FIG. 1B are illustrative representations of a conventional slot structure of a Personal Handy-Phone System.
Figure 1B:
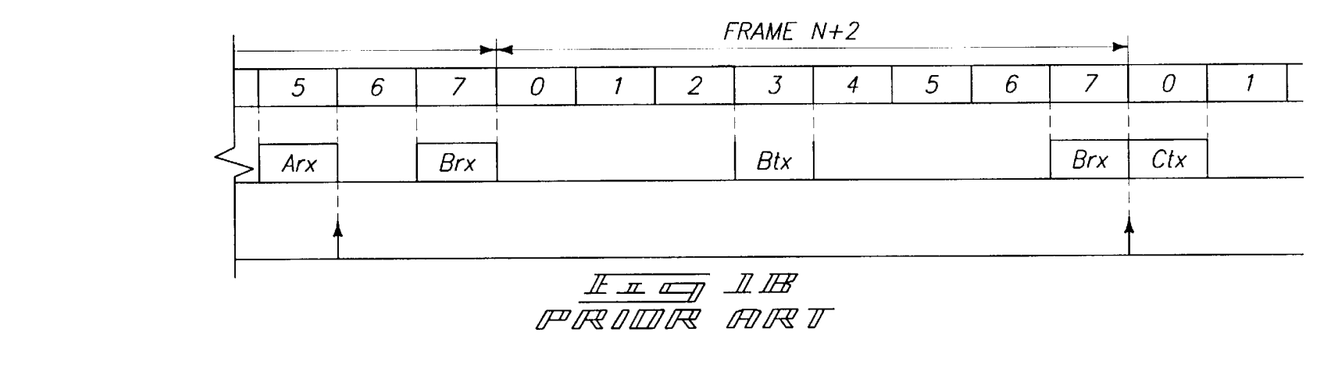

FIG. 1A–FIG. 1B show a frame structure for a conventional Personal Handy-Phone System. A frame structure is illustrated where different data packets Atx, Arx, Btx, Brx and Ctx are enabled by software. The enabling and disabling of data packets occurs synchronous to channel slot channeling and is indicated by the vertical arrows. For example, packet B is enabled after frame N, slot 7 and before frame N+1, slot 3. If such timing parameters are not met, packet B will not start in the desired correct slot (frame N+1, slot 3) but too early (frame N, slot 7) or too late (frame N+1, slot 7). Such also applies to the disabling of data packets. For example, if packet A is not disabled after frame N+1, slot 5 and before frame N+1, slot 1, an additional packet A may be sent in frame N+2, slot 1.

In other communication protocols, communications slots are utilized without a frame structure. One such communication protocol is Bluetooth. In systems such as Bluetooth, data packets are normally enabled when data is to be sent and not at a fixed slot number.

Figure 2:
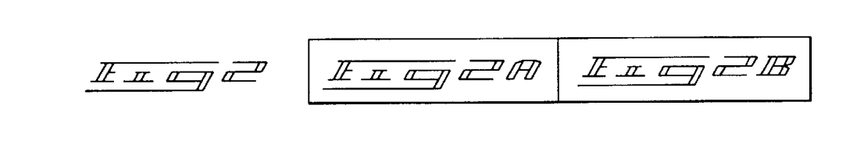
Figure 2A:
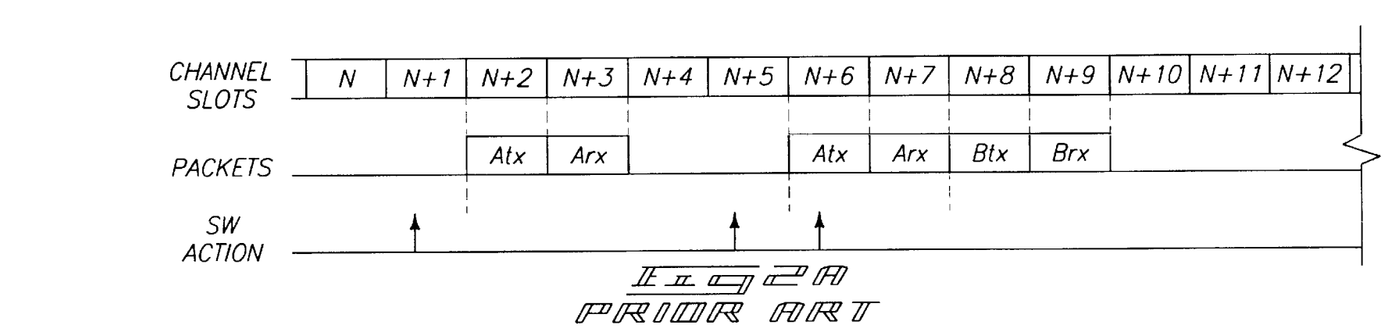
FIG. 2A–FIG. 2B are illustrative representations of a conventional slot structure of a Bluetooth communication system.
Figure 2B:
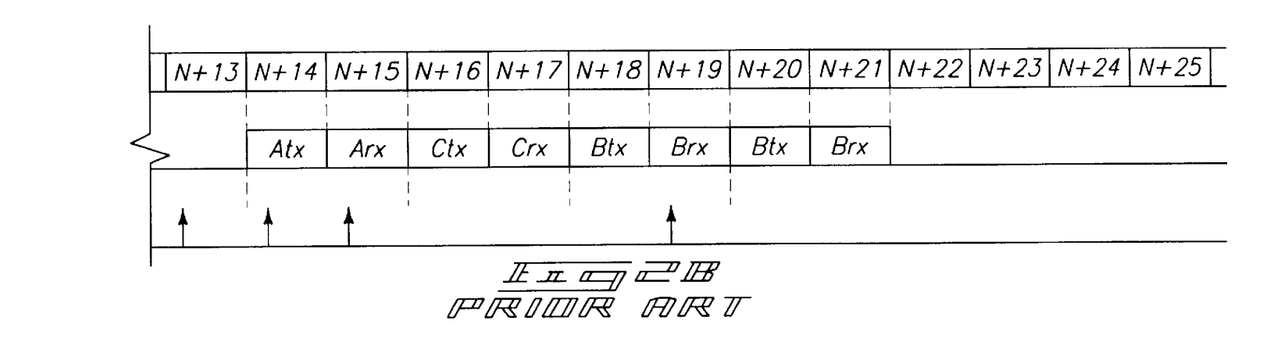

Referring to FIG. 2A–FIG. 2B, further details of the Bluetooth communication protocol are described. For example, if a packet A is to be sent at a first available slot, then the communicating device determines the current slot number and programs the first suitable slot number to activate the data packet. In the illustrated example, data packet A could be sent in slot N+2 and slot N+3. If multiple packets are to be sent within a short time interval (e.g., shorter than the data packets can be sent corresponding to packets A, C, B being enabled during slots N+13–N+15), software manages multiple packets (e.g., packet A, slot N+14 and N+15; packet C, slot N+16 and N+17; packet B, slot N+18 and N+19). Data packets are activated on a first-in/first-out basis (FIFO) in conventional arrangements.

BRIEF DESCRIPTION OF THE DRAWINGS

Preferred embodiments of the invention are described below with reference to the following accompanying drawings.

FIG. 1 is a map illustrating how FIG. 1A–FIG. 1B are to be assembled.

FIG. 2 is a map illustrating how FIG. 2A–FIG. 2B are to be assembled.

FIG. 5 is a map illustrating how FIG. 5A–FIG. 5B are to be assembled.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to an aspect of the invention, a Bluetooth communication unit comprises: communication circuitry configured to communicate wireless signals using a plurality of communication links of a piconet according to a Bluetooth communication protocol; and processing circuitry coupled with the communication circuitry and configured to at least one of provide data into packets to be communicated in slots using the communication links and retrieve data from packets communicated in slots using the communication links, the processing circuitry being further configured to analyze the communication links of the piconet and to prioritize an order of communication of the packets responsive to the analysis.

Another aspect of the invention provides a wireless communication system comprising: a plurality of first communication devices individually including: communication circuitry configured to communicate wireless signals; and processing circuitry coupled with the communication circuitry and configured to process the wireless signals; and a second communication device including: communication circuitry configured to communicate the wireless signals with respective first communication devices; and processing circuitry coupled with the communication circuitry and configured to process the wireless signals and to prioritize communication of the wireless signals with the first communication devices.

The present invention also provides a wireless communication device comprising: communication circuitry adapted to communicate wireless signals with a plurality of communication devices; and processing circuitry coupled with the communication circuitry and configured to process the wireless signals and to prioritize an order of communication of the wireless signals with respective remote communication devices.

Another aspect of the invention includes a Bluetooth communication method comprising: providing a master communication unit adapted to establish a plurality of communication links to provide a piconet in accordance with a Bluetooth communication protocol; providing a plurality of data packets to be communicated using respective communication links; prioritizing the communication links; and communicating the data packets using the communication links according to the prioritizing.

Another aspect provides a communication method comprising: providing a first communication device adapted to establish a plurality of communication links with a plurality of second communication devices; providing a plurality of data packets to be communicated to respective second communication devices using respective communication links; prioritizing the communication links using the first communication device; and communicating the data packets using the communication links according to the prioritizing.

Another aspect of the present invention provides a wireless communication method comprising: providing a plurality of wireless communication devices; establishing a plurality of communication links intermediate the wireless communication devices; providing a plurality of wireless signals to be communicated using respective communication links; prioritizing the wireless signals according to the communication links; and communicating the wireless signals using the communication links according to the prioritizing.

The invention also provides a wireless communication method comprising: providing a plurality of communication devices; providing a plurality of data packets; establishing communication links intermediate the communication devices; and communicating the data packets using the respective communication links comprising: identifying one of the data packets corresponding to the communication link having a fastest transfer rate; communicating the identified data packet; and repeating the identifying and the communicating the remaining data packets.

Yet another aspect of the invention provides a Bluetooth communication method comprising: providing a plurality of communication units; providing one of the communication units as a master unit; providing others of the communication units as slave units; establishing a plurality of communication links intermediate the master unit and the slave units; providing a plurality of data packets to be communicated using respective communication links; analyzing data transfer rates of respective communication links using the master station; prioritizing the communication links from those having fastest data transfer rates to those having slowest data transfer rates using the master station; associating the data packets with respective communication links; and communicating the data packets using the respective communication links after the prioritizing, the communicating comprising: identifying one of the data packets corresponding to the communication link having the fastest transfer rate; communicating the identified data packet; and repeating the identifying and the communicating the remaining data packets.

Figure 3:
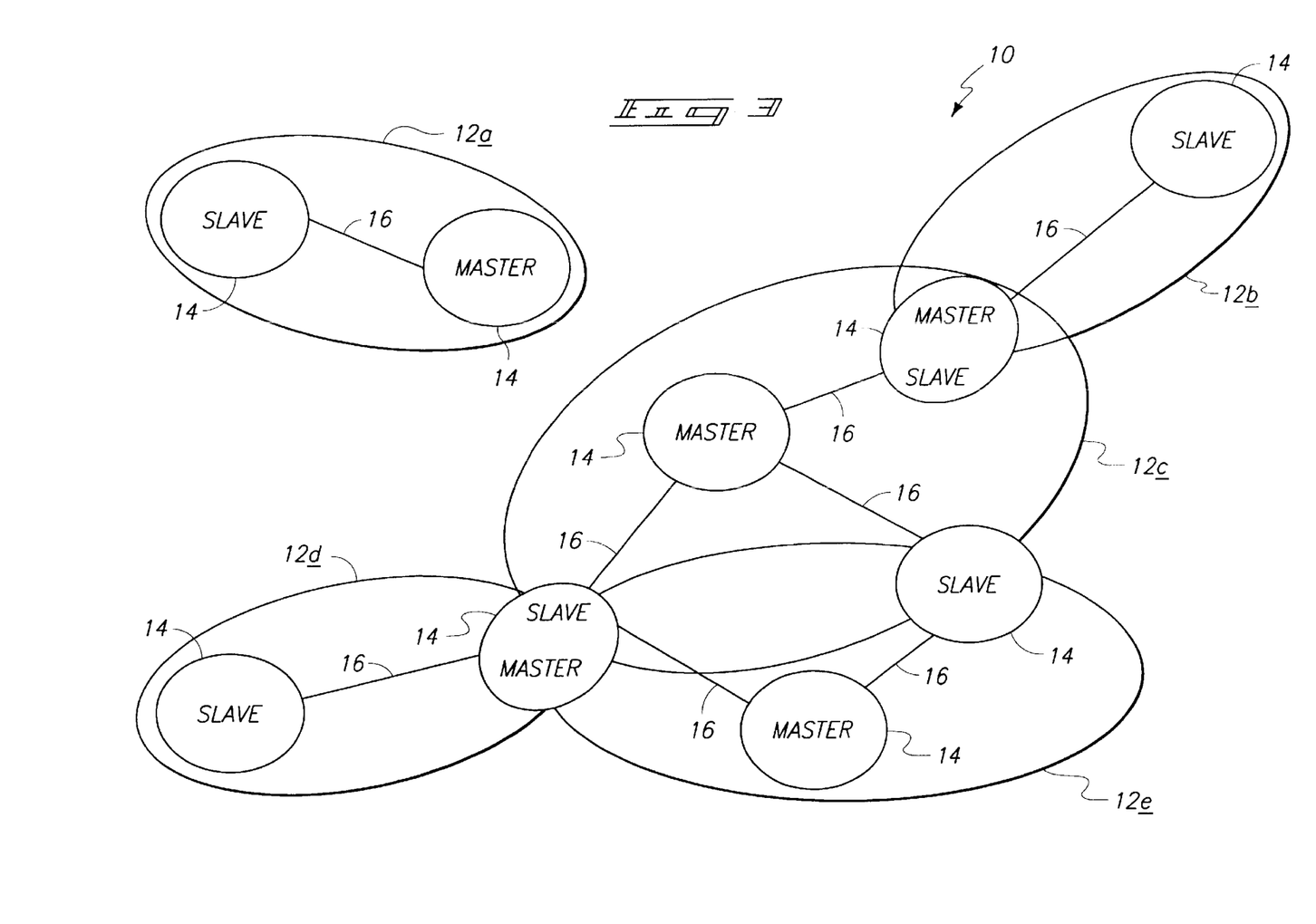
FIG. 3 is an illustrative representation of piconet structures of a Bluetooth communication system.

Referring to FIG. 3, a communication network topology of an exemplary communication system 10 is shown. The depicted communication network 10 comprises a Bluetooth communication network in the described embodiment. Other communication protocols or configurations are possible. Operations of a Bluetooth communication system are described in detail in a publication entitled "Comprehensive Description of the Bluetooth System" available from Telefonaktiebolaget LM Ericsson, pages 1–72, 1998, and incorporated herein by reference.

In general, Bluetooth communication systems provide short range, cable replacement radio technology. Such communication systems may be utilized to link mobile computing devices to communication devices in an exemplary arrangement. The Bluetooth communication systems are configured to handle both voice and data communications.

In the Bluetooth communication protocol, a channel is represented by a pseudo-random hopping sequence through 23 or 79 radio frequency (RF) carriers. A channel hopping sequence may be derived from a unit unique address. A channel is divided into time slots (0 to $2^{27}-1$ slots) counted cyclically. Channel slots are described in further detail below with reference to FIG. 5A–FIG. 5B. Individual time slots correspond to a frequency hop in accordance with the Bluetooth standard. Consecutive hops correspond to different hop frequencies and a nominal hop rate of 1600 hops/s is provided.

The depicted communication system 10 of FIG. 3 includes a plurality of piconets 12a–12e. Piconets 12a–12e may be linked together as illustrated. Communication devices 14 implement wireless communications within the piconets 12a–12e. Communication units 14 may be individually referred to as a master unit, a slave unit, or both.

A master communication device 14 is provided for individual piconets 12a–12e. Both point-to-point and point-to-multi-point communications are supported by the Bluetooth communications protocol. Further, a single communication device 14 may be a slave unit in several piconets 12a–12e. Further, a master unit or slave unit of one piconet 12a–12e may become a slave unit of another piconet.

The status of a single communication device 14 as a slave unit, a master unit, or a slavemaster unit may dynamically change during operation of communication system 10. Further, the number of slave units coupled with a particular associated master unit can change during the operation of communication system 10. Slave units can dynamically couple and decouple with a master unit during communications thereby changing the number of slave units coupled with the master unit.

Communication links 16 are dynamically established intermediate communication devices 14 to provide data transfer between the connected communication devices 14. Communication devices 14 (i.e., a master unit or a slave unit) communicate wireless signals using communication links 16. Exemplary wireless signals include radio frequency signals. Communication links 16 comprise a synchronous connection-oriented (SCO) link and/or an asynchronous connectionless (ACL) link.

Figure 4:
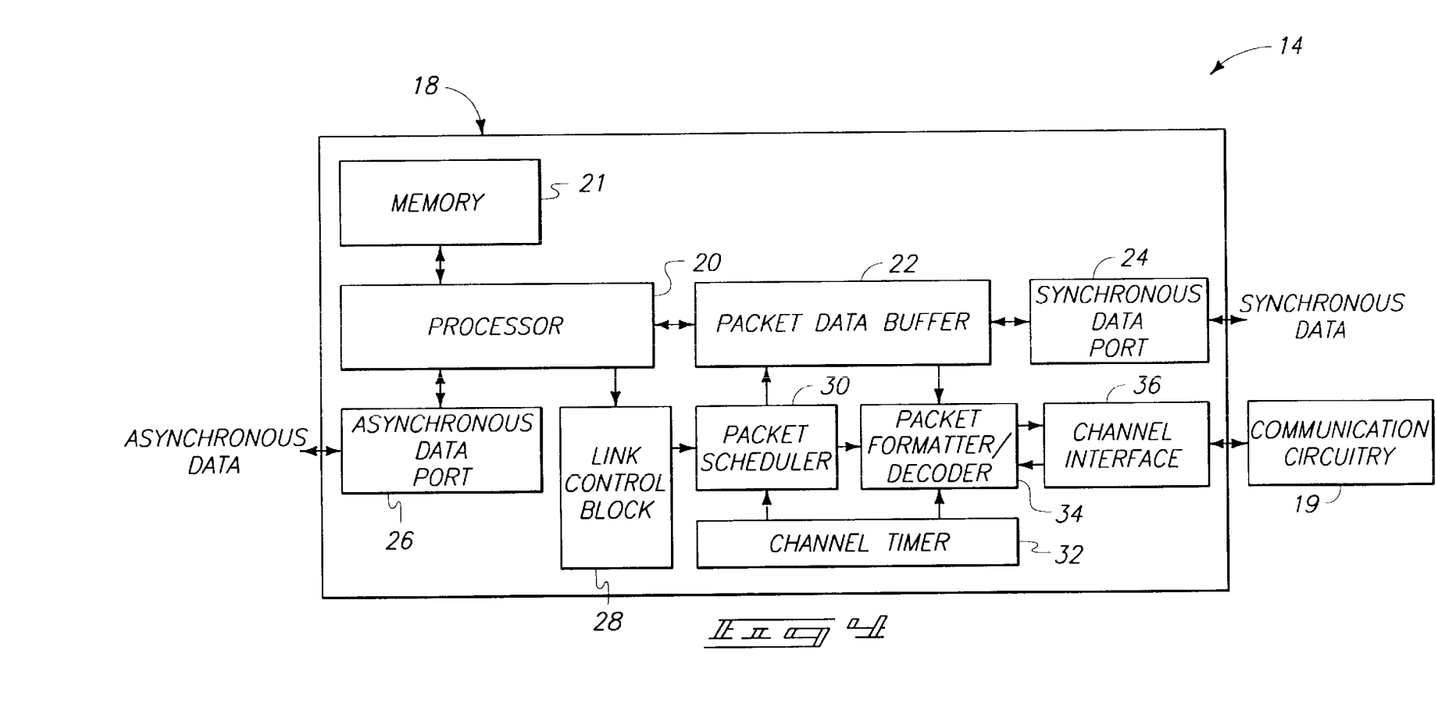
FIG. 4 is a functional block diagram of an exemplary communication unit.

Referring to FIG. 4, components of an exemplary configuration of communication device 14 (e.g., communication unit according to the Bluetooth standard) are shown. Communication device 14 generally includes processing circuitry 18 and communication circuitry 19. Other configurations of communication device 14 are possible.

Communication circuitry 19 of the master unit is configured to dynamically couple and decouple with communication links 16 associated with dynamic slave units. As described below, processing circuitry 18 of a master unit is configured to analyze established communication links to determine priority of communications with the associated slave units initially upon communication start-up and following coupling or decoupling of an associated slave unit in accordance with one aspect of the present invention.

The depicted processing circuitry 18 includes a processor 20, a memory 21, a packet data buffer 22, a synchronous data port 24, an asynchronous data port 26, a link control block 28, a packet scheduler 30, a channel timer 32, a packet formatter/decoder 34, and a channel interface 36.

In general, processing circuitry 18 of communication device 14 is configured to provide data to be communicated into packets and to retrieve data from packets. According to aspects of the present invention, processing circuitry 18 is configured to analyze communication links 16 of the appropriate piconet and to prioritize an order of communication of the packets using the communication links 16 responsive to the analysis. Further details regarding such prioritization are described below.

Processor 20 of processing circuitry 18 comprises a microprocessor in the described embodiment. Processor 20 runs a software protocol stack of communication device 14 and controls communications via communication links 16 through utilization of link control block 28. Memory 21 stores executable instructions for execution by processor 20 in the described embodiment. Memory 21 includes random access memory (RAM) and read only memory (ROM) in the described arrangement. Memory 21 is internal of processor 20 in other configurations.

Link control block 28 stores information for the corresponding communication links 16 of the particular communication device 14. Such information can include communication link (packet) priority, communication link status (enable/disable), and communication link data buffer status (full/empty). In accordance with the invention, packets are transferred based upon priority of communication links 16. For example, packet scheduler 30 examines the communication link priority to from the link control block 28 for every channel time slot. Packet scheduler 30 accesses channel slot timing information for checking communication link priorities from channel timer 32. Channel timer 32 keeps track of channel timing and: provides channel slots and bit information.

Once packet scheduler 30 schedules a packet for communication, packet formatter/decoder 34 is activated to transfer the appropriate packet. Timing for such packet transfer is derived from channel timer 32. For transmit operations, packet formatter/decoder 34 reads data from packet data buffer 22 and formats transmit packets. For reception operations, packet formatter/decoder 34 decodes received packets and stores the data in packet data buffer 22.

The channel interface 36 interfaces transmit and receive communications intermediate packet formatter/decoder 34 and communication circuitry 19. Synchronous data is handled by synchronous data port 24 and asynchronous data is handled by asynchronous data port 26.

Channel interface 36 of processing circuitry 18 is coupled with communication circuitry 19 providing the physical channel. Communication circuitry 19 is configured to communicate wireless signals along communication links 16 of the associated piconet 12. In the described embodiment, communication circuitry 19 includes a radio configured to implement radio frequency (RF) wireless communications within a frequency band of 2400–2483.5 MHz in Europe and the United States.

Figure 5:
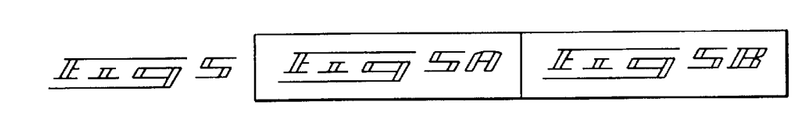
Figure 5A:
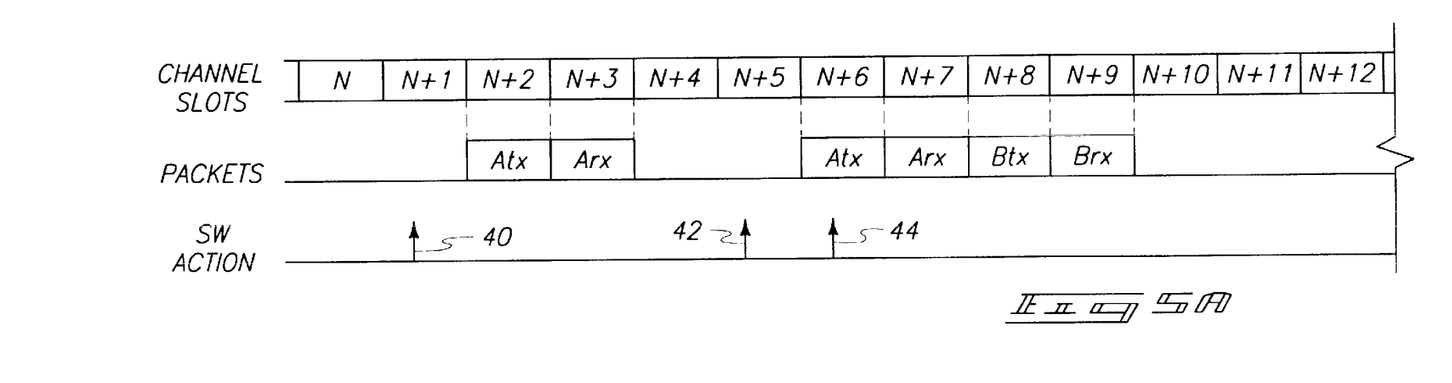
FIG. 5A–FIG. 5B are illustrative representations of a slot structure of a communication system according to the present invention.
Figure 5B:
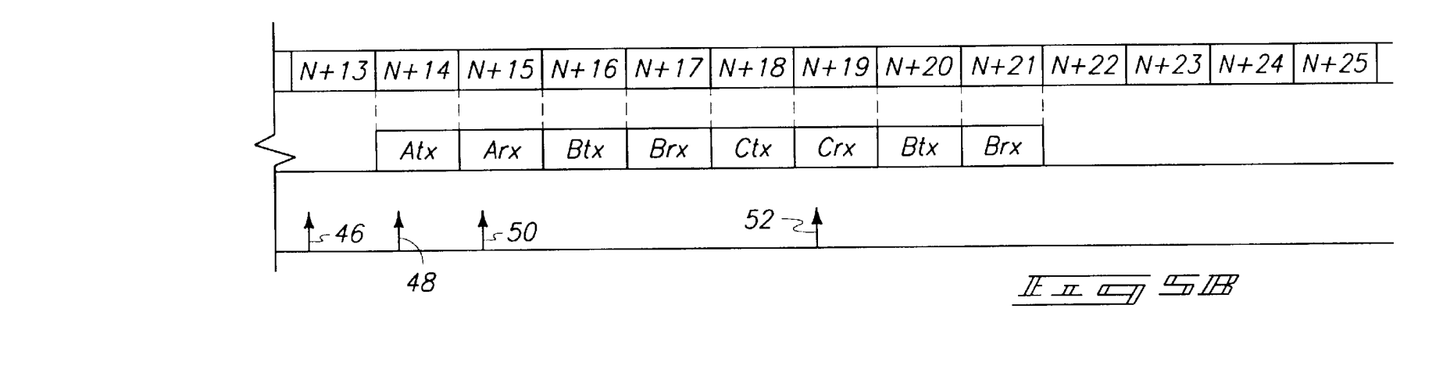

Referring to FIG. 5A–FIG. 5B, prioritized packet activation of communication system 10 is shown. The present invention provides a communication system 10 which enables packets according to priority as opposed to allocating packets to channel slot numbers for activation.

In the described embodiment, the packet with the highest priority is sent in a first available communication channel slot. After the packet has been transferred, the packet is disabled to prevent it from being sent again. Such prioritization of packets avoids the need to provide software or other systems to manage and track slot numbers.

Twenty-six exemplary channel slots (N through N+25) are depicted in FIG. 5A–FIG. 5B. Time increases from left to right in FIG. 5A–FIG. 5B. Data packets (Atx, Arx, Btx, Brx, Ctx, Crx) are illustrated corresponding to various slots. Tx slots correspond to packets transmitted from communication device 14. Rx slots correspond to packets received by communication device 14. A, B, C designations correspond to respective communication links.

The illustrated software (SW) action implemented by processor 20 controls enabling of packets. Enabling of packets is represented by arrows within FIG. 5A–FIG. 5B. Arrow 40 represents a moment in time when a first A packet is enabled. Once a packet is enabled, it is sent in the first available slot if no other packets are enabled. Processor 20 activates the packet and it is sent in the first available slot. Because no other packets are to be communicated at a similar point in time, first A packet is activated in slot N+2 and slot N+3 responsive to enablement at time 40. The packet is subsequently deactivated following the communication of the packet.

Thereafter, multiple packets including a second A packet and a first B packet are indicated to be communicated. More particularly, at a moment in time represented by arrow 42, a second A packet is enabled by processor 20. The second A packet is communicated in first available slots N+6 and N+7. At a moment in time represented by arrow 44, processor 20 enables the first B packet. The first B packet is communicated in first available slots N+8 and slots N+9 as illustrated. It is noted that the first B packet is enabled at time 44 after the initiation of communication of the second A packet. Accordingly, any priority determination is not necessary for the communication of the second A packet and the second B packet. The individual packets are disabled or deactivated following the communication thereof.

Subsequently, a plurality of packets are enabled in a sufficiently close period of time such that the packets cannot be immediately communicated. For example, at a moment in time corresponding to arrow 46, a third A packet is enabled initially. At a moment in time represented by arrow 48, a first C packet is enabled. At a moment in time represented by arrow 50, a second B packet is enabled. As shown, multiple packets enabled at moments in time 48, 50 are enabled during the communication of one packet (e.g., the third A packet).

According to certain aspects of the invention, communication device 14 prioritizes an order of communication of packets responsive to multiple packets being enabled to be sent within a short period of time (i.e., a shorter period of time than all the enabled packets can be physically sent). In such a situation, processor 20 manages packet priority and packet scheduler 30 activates packets according to such priority.

Processing circuitry 18, including processor 20, is configured to analyze communication links 16 according to one aspect of the present invention to determine priorities for communications. For example, processing circuitry 18 analyzes the data transfer rates of individual communication links 14 using information from link control block 28. Thereafter, processing circuitry 18 prioritizes communication links 14 from those having the fastest data transfer rates to those having the slowest data transfer rates. The appropriate packets are then enabled according to the determined prioritization. Such allows a high data rate packet to be sent before a low data rate packet.

Other criteria (e.g., maximum data delay, type of data such as asynchronous, synchronous, etc.) are utilized to determine prioritization according to other aspects of the invention.

Referring again to the described example of FIG. 5A–FIG. 5B, packet A corresponds to a communication link of highest priority, packet B corresponds to a communication link of middle priority, and packet C corresponds to a communication link of lowest priority. The priority determination follows analysis of the communication links associated with packets A, B, C. Based upon the above-determined priority, the packets are sent in the illustrated order wherein third packet A is communicated in slots N+14 and N+15, second packet B is communicated in slots N+16 and N+17, and first packet C is communicated in slots N+18 and N+19. The packets are disabled following communication.

During the communication of packet C in slots N+18 and N+19, a third B packet is enabled by processor 20 at a moment in time represented by arrow 52. The third B packet is communicated in slots N+20 and N+21 after the communication of packet C as shown. The prioritization does not apply to the third B packet inasmuch as it is enabled after the initiation of communication of the C packet.

Figure 6:
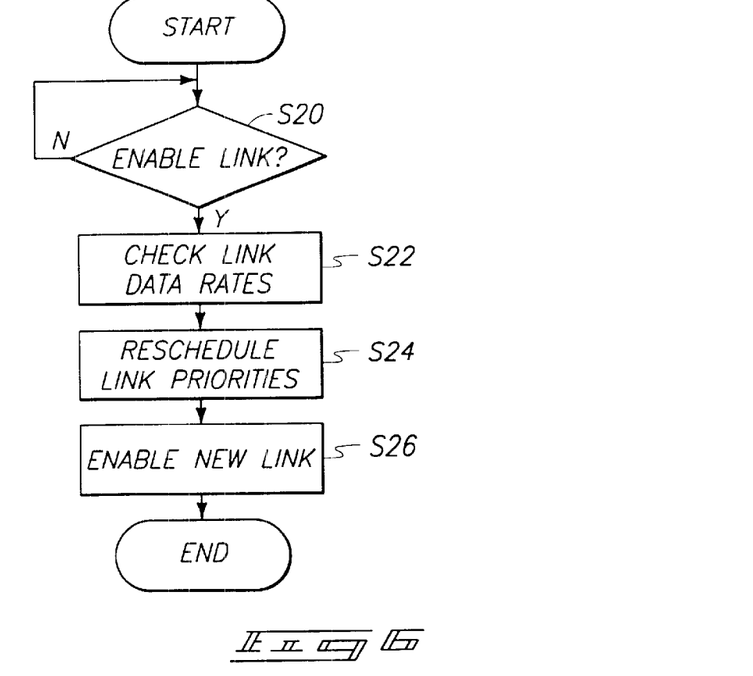
FIG. 6 is a flowchart illustrating an exemplary method for enabling communication links.
Figure 7:
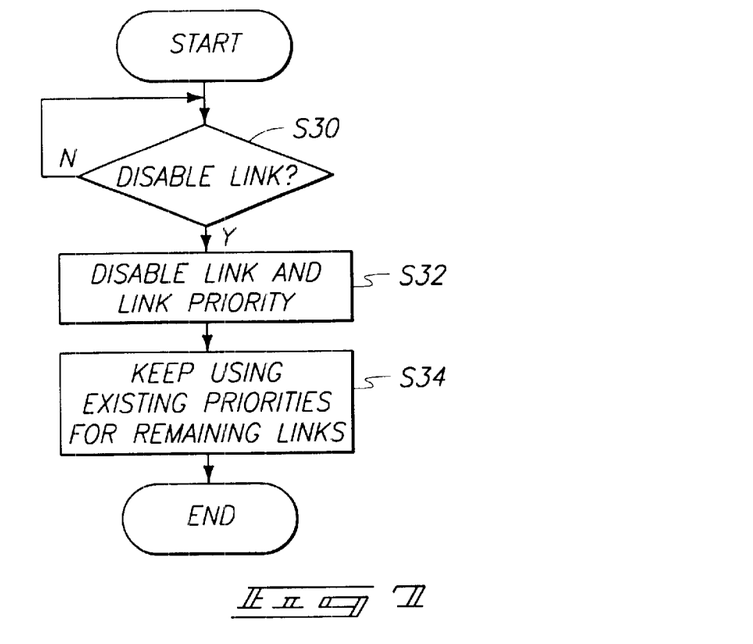
FIG. 7 is a flowchart illustrating an exemplary method for disabling communication links.

Referring to FIG. 6–FIG. 7, exemplary methodologies for establishing priorities are illustrated. Processor 20 is configured in the described embodiment to execute a set of instructions stored in memory 21 to perform the depicted methodologies.

The priorities are initially determined for communication links established with a master unit upon commencement of communication operations. As previously mentioned, slave units and communication links may be dynamically coupled and decoupled with the master unit during communications. According to certain aspects of the present invention, communication devices 14 are individually configured to dynamically determine priorities responsive to such coupling and/or decoupling of slave units during communications. Communication devices 14 may dynamically determine priorities based on data transfer characteristics, such as data transfer rates, time-out, maximum data delay, etc.

Referring specifically to FIG. 6, communication link priority is determined when enabling a link (activating a connection with a new communication device 14). The link priority is used to enable packets which need to be transferred over the physical channel to provide a required link data rate. Priorities of existing links and a new link are rescheduled when a new link is enabled according to certain aspects of the invention.

Initially at step S20, processor 20 determines whether a link has been enabled. The process illustrated by FIG. 6 is not executed until a link is enabled as determined at step S20.

Following the enabling of a link, processor 20 proceeds to step S22 to check data transfer rates of all communication links. Such is performed by master communication device with respect to individual communication links of associated slave communication devices within a given piconet.

Following the analysis of the communication links, processor 20 proceeds to step S24 and reschedules link priorities to accommodate the enabled communication link.

At step S26, processor 20 enables the new communication link and communications are provided with the recently added communication device 14 using the new communication link according to the determined link priority.

Referring to FIG. 7, an exemplary methodology for execution by processor 20 during disabling operation of a communication link is shown.

Initially, at step S30, processor 20 monitors for an indication that a communication link is to be disabled. Processor 20 enters the subroutine of FIG. 7 responsive to the disabling of a communication link.

Following the indication of disablement of a communication link, processor 20 proceeds to step S32 to disable the appropriate communication link and corresponding link priority.

Processor 20 then proceeds to step S34 and continues communications using existing priorities for the remaining communication links. Such priorities are maintained until another link is enabled or disabled and the above methodologies are implemented again.

Figure 8:
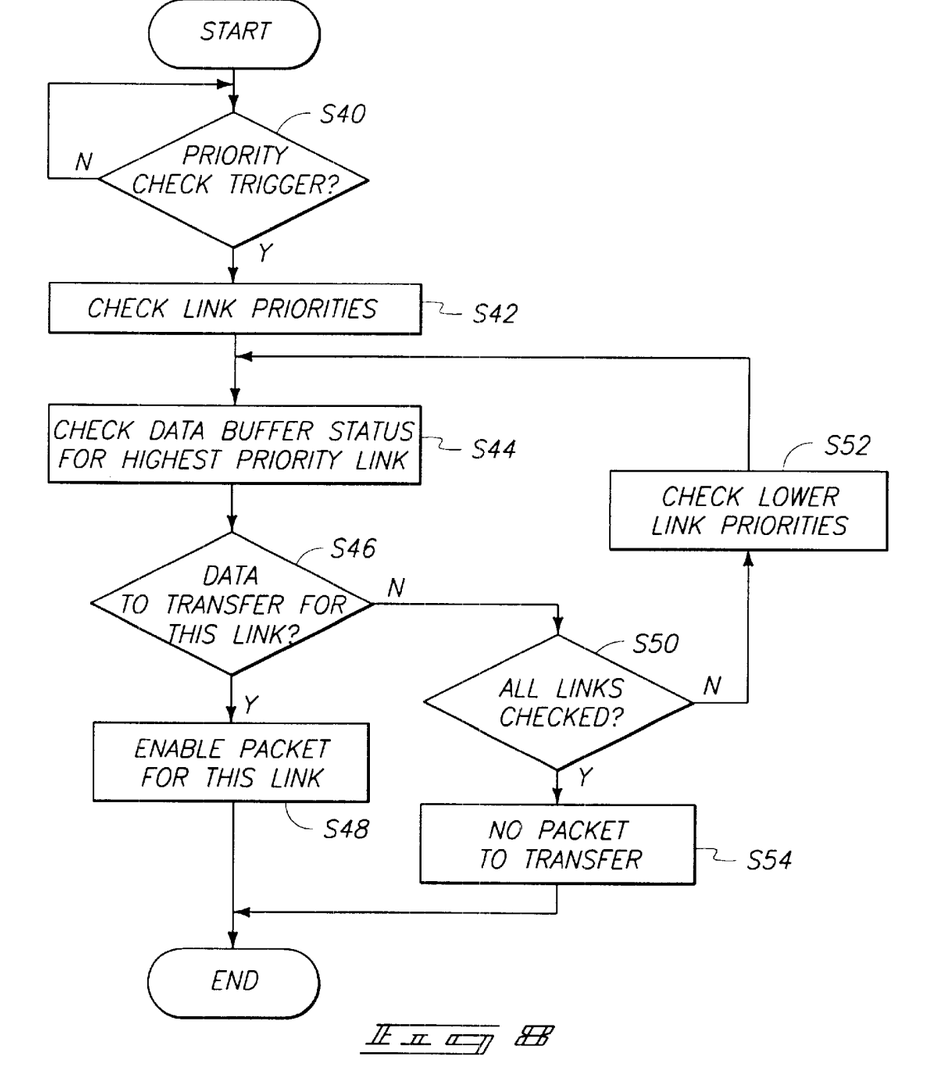
FIG. 8 is a flowchart illustrating an exemplary method to determine communication priority in a communication system.

Referring to FIG. 8, an exemplary methodology for implementing prioritization of the communication links is shown. In the described configuration, packet scheduler 30 arranges the communication of packets. Packet scheduler 30 examines determined link priorities and the data buffer status to determine the highest priority link for which data will be transferred, and accordingly enables the transfer of a high priority packet. If there is no data to be sent for the highest priority link, then lower priority links are checked. If there is no data to be sent for any link, no packet is enabled.

Packet scheduler 30 is configured to execute the methodology depicted in FIG. 8 to schedule the communication of packets. Packet scheduler 30 is provided as a processor configured to execute instructions which implement the depicted methodology in one embodiment.

Initially, packet scheduler 30 awaits the reception of a priority check trigger at step S40. Packet scheduler 30 remains at step S40 until a priority check trigger is received. Channel timer 32 keeps track of channel timing and provides channel slots and bit information. The depicted methodology of FIG. 8 is executed for individual slots responsive to timing from channel timer 32.

Packet scheduler 30 proceeds to check link priorities at step S42 following the receipt of a priority check trigger from channel timer 32.

At step S44, packet scheduler 30 checks data buffer status for the corresponding highest priority link.

At step S46, packet scheduler 30 determines whether there is data to be communicated for the particular link as determined from the data buffer status. If so, packet scheduler 30 proceeds to step S48. If not, packet scheduler 30 proceeds to step S50.

During execution of step S48, a packet is enabled for the corresponding communication link by packet scheduler 30. The packet is subsequently communicated.

Alternatively, if no data is present for the highest priority link as determined at step; S46, packet, scheduler 30 determines whether all communication links have been checked at step S50. If not, packet scheduler 30 proceeds to step S52. If all communication links have been checked, packet scheduler 30 proceeds to step S54.

During execution of step S52, packet scheduler 30 identifies the communication link with the next highest priority. Thereafter, packet scheduler 30 again returns to step S44 to check the data buffer status for the next highest priority link.

Alternatively, if all communication links are checked at step S50, packet scheduler 30 proceeds to step S54 and determines that no packet has been enabled for communication.

Figure 9:
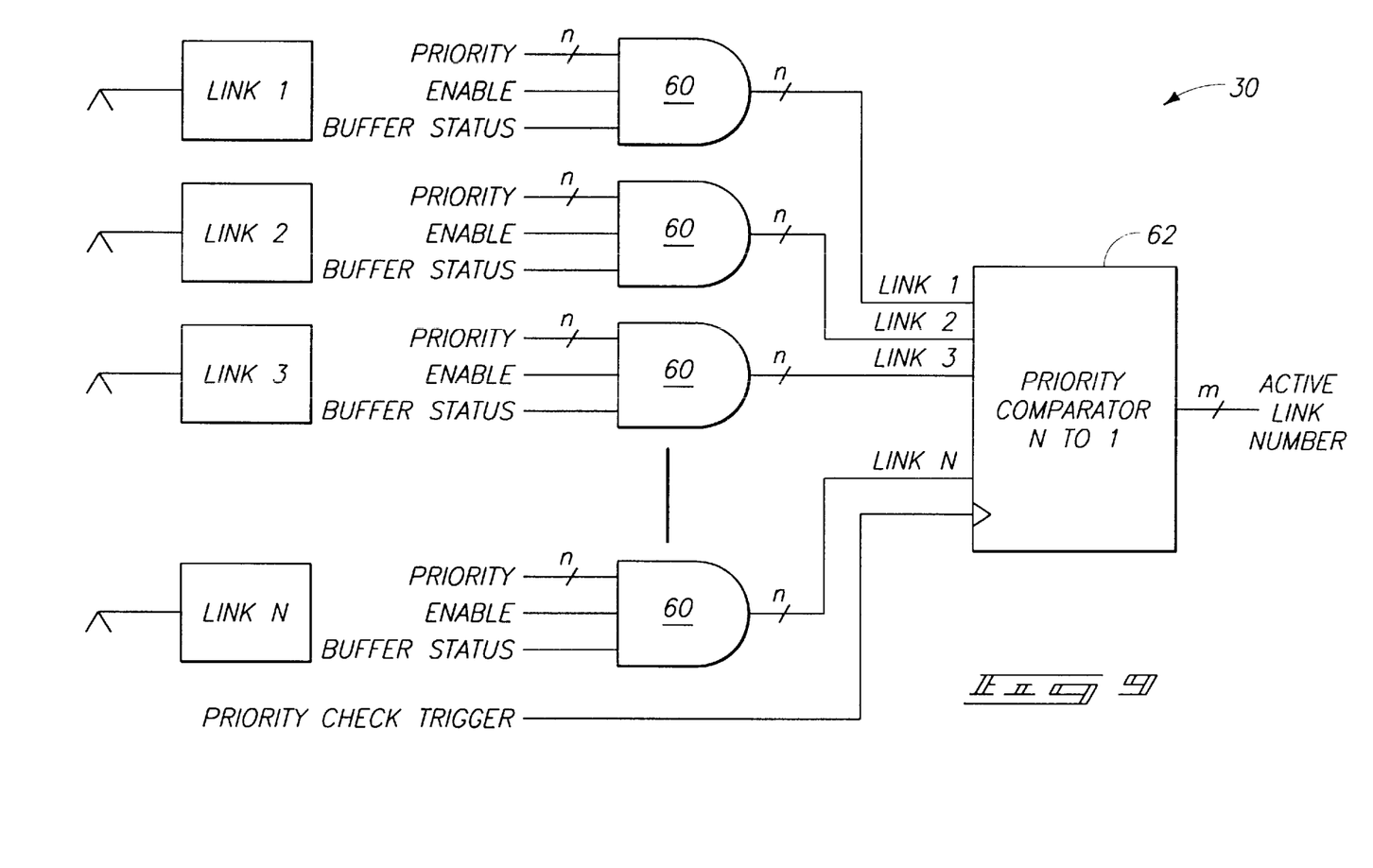
FIG. 9 is a schematic diagram of an exemplary packet scheduler of the communication unit.

Referring to FIG. 9, one embodiment of packet scheduler 30 implemented in hardware is shown. The depicted packet scheduler 30 comprises a plurality of AND gates 60 coupled with a priority comparator 62. Priority comparator 62 is additionally coupled with channel timer 32 (shown in FIG. 4) to receive the priority check trigger. Packet scheduler 30 will, for a channel slot, check packet priorities and data buffer status to determine the sending of a packet.

Upon reception of the priority check trigger, packet scheduler 30 checks priorities of links 1–N. Individual links correspond to one of AND gates 60. The Priority, Enable and Buffer Status lines are supplied from link control block 28. As shown, the priority check is a comparison of the link priorities and data buffer status flags (Enable, Buffer Status). The corresponding priority (as indicated by n Priority lines) of a link is forwarded to priority comparator 62 if the respective Enable and Buffer Status lines are enabled. The flags indicate whether a packet has been enabled and whether data is present to be communicated. Priority comparator 62 thereafter outputs an active link number to packet formatter/decoder 34 which identifies the link of the highest priority for communication of the present packet responsive to the comparison. Packet scheduler 30 is implemented in other configurations in other embodiments.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A wireless communication method comprising:
   providing a plurality of communication devices;
   providing a plurality of data packets;
   establishing communication links intermediate the communication devices; and
   communicating the data packets using the respective communication links comprising:
      identifying one of the data packets corresponding to the communication link having a fastest transfer rate;
      communicating the identified data packet; and
      repeating the identifying and the communicating the remaining data packets.

2. The method according to claim 1 further comprising prioritizing the communication links from those having fastest data transfer rates to those having slowest data transfer rates.

3. The method according to claim 2 wherein the establishing comprises coupling and decoupling communication devices, and the prioritizing comprises prioritizing after individual couplings and decouplings.

4. The method according to claim 1 wherein the communicating comprises communicating according to a Bluetooth communication protocol.

5. A Bluetooth communication method comprising:
   providing a plurality of communication units;
   providing one of the communication units as a master unit;
   providing others of the communication units as slave units;
   establishing a plurality of communication links intermediate the master unit and the slave units;
   providing a plurality of data packets to be communicated using respective communication links;
   analyzing data transfer rates of respective communication links using the master station;
   prioritizing the communication links from those having fastest data transfer rates to those having slowest data transfer rates using the master station;
   associating the data packets with respective communication links; and
   communicating the data packets using the respective communication links after the prioritizing, the communicating comprising:
      identifying one of the data packets corresponding to the communication link having the fastest transfer rate;
      communicating the identified data packet; and
      repeating the identifying and the communicating the remaining data packets.

* * * * *